US006874130B1

(12) United States Patent
Baweja et al.

(10) Patent No.: US 6,874,130 B1
(45) Date of Patent: Mar. 29, 2005

(54) COPY/MOVE GRAPHICAL USER INTERFACE APPARATUS AND METHOD

(75) Inventors: Baljeet Singh Baweja, Austin, TX (US); Kulvir Singh Bhogal, Austin, TX (US); Nizamudeen Ishmael, Jr., Austin, TX (US); Mandeep Singh Sidhu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,228

(22) Filed: Feb. 17, 2000

(51) Int. Cl.$^7$ .............................................. G06F 15/00
(52) U.S. Cl. ...................................... 715/805; 715/764
(58) Field of Search ................................ 715/764, 801, 715/805; 345/704, 788, 781, 805, 806, 835, 841, 854, 855, 866

(56) References Cited

U.S. PATENT DOCUMENTS

| | | | |
|---|---|---|---|
| 5,546,525 A | | 8/1996 | Wolf et al. |
| 5,594,857 A | | 1/1997 | King et al. |
| 5,625,763 A | | 4/1997 | Cirne |
| 5,692,194 A | | 11/1997 | Nguyen et al. |
| 5,737,557 A | | 4/1998 | Sullivan |
| 5,825,358 A | | 10/1998 | Silvent et al. |
| 5,933,139 A | | 8/1999 | Feigner et al. |
| 5,969,705 A | * | 10/1999 | Fisher et al. ................. 345/114 |
| 6,085,251 A | * | 7/2000 | Fabozzi, II .................. 709/230 |
| 6,344,864 B1 | * | 2/2002 | Watanabe .................... 345/788 |
| 6,401,220 B1 | * | 6/2002 | Grey et al. ..................... 714/33 |
| 6,411,314 B1 | * | 6/2002 | Hansen et al. ............... 345/769 |
| 6,421,072 B1 | * | 7/2002 | Ku et al. ...................... 345/804 |
| 6,564,231 B1 | * | 5/2003 | Yamada et al. ............. 707/201 |
| 6,629,129 B1 | * | 9/2003 | Bookspan ................... 709/204 |
| 6,657,702 B1 | * | 12/2003 | Chui et al. ..................... 355/40 |

OTHER PUBLICATIONS

Smalltalk/V PM Unique Method for Creating Dialog Boxes; International Business Machines Technical Disclosure Bulletin; vol. 34, No. 4A, Sep. 1991, pp. 390–392.

Here's the Kit (Software Developer's Toolkit).; Goldberg, J.; EXE, vol. 5, No. 6, pp. 40, 43–44, Nov. 1990.

User Friendly Support Environment For Requirement Analysis in User Interface Design; Seongjun Yun et al; Proceedings of the 1999 ICPP Workshops on Collaboration and Mobile Computing; pp. 414–417.

* cited by examiner

*Primary Examiner*—Cao (Kevin) Nguyen
(74) *Attorney, Agent, or Firm*—Duke W. Yee; Jeffrey S. LaBaw; Francis Lammes

(57) ABSTRACT

A copy/move graphical user interface apparatus and method. The apparatus displays a graphical user interface informing a user of a current status of a copy/move operation. The graphical user interface includes progress bars indicating the progress of a current file copy/move operation as well as the overall copy/move operation. The graphic user interface further includes estimated times of completion and a listing of files that are in a copy/move queue. Additionally, the graphical user interface allows a user to modify the order in which files are copied/moved and to skip or delete files in the copy/move queue.

63 Claims, 3 Drawing Sheets

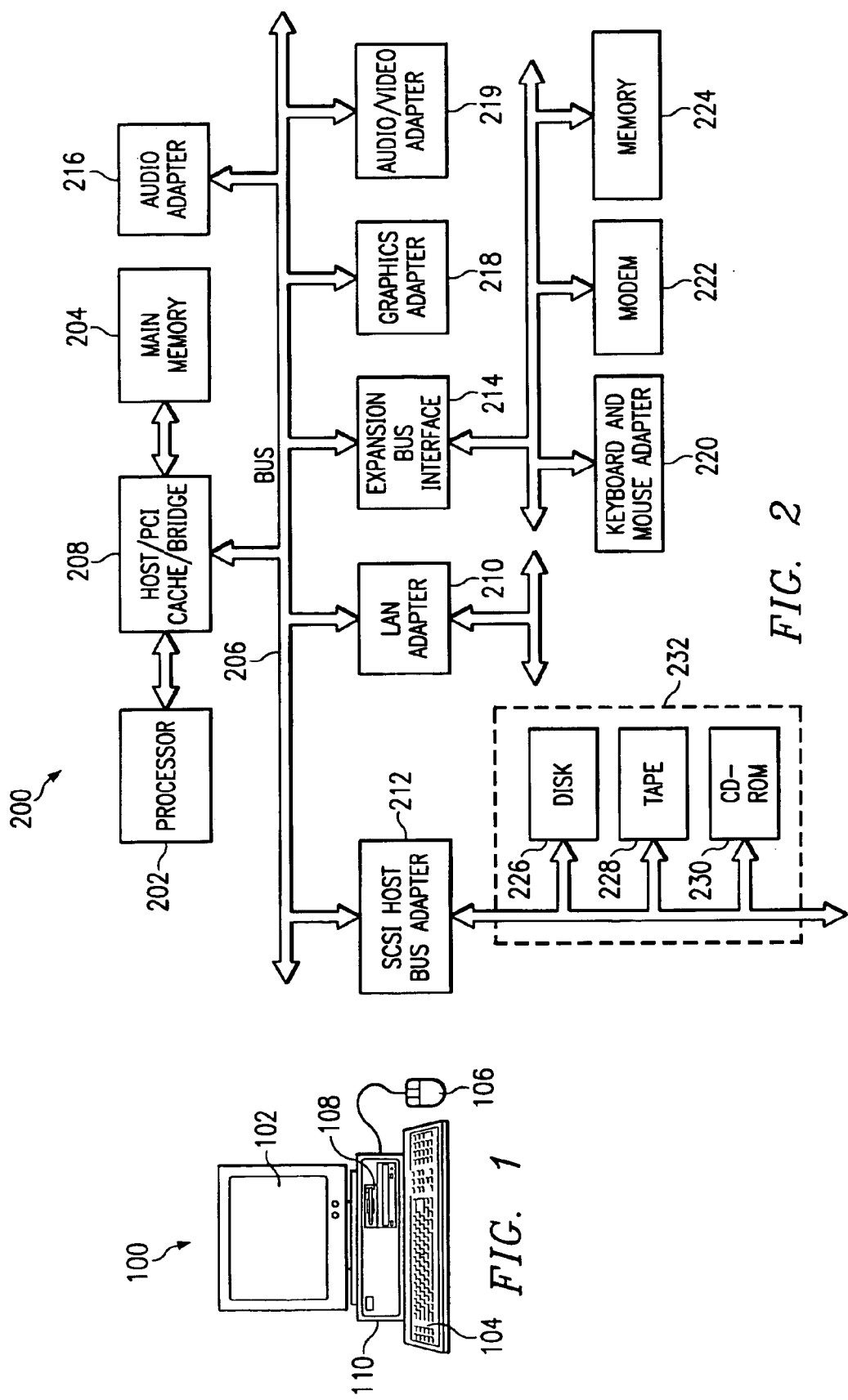

COPY/MOVE GRAPHICAL USER INTERFACE APPARATUS AND METHOD

BACKGROUND OF THE INVENTION

1. Technical Field

The present invention is directed to a copy/move graphical user interface (GUI) apparatus and method. Specifically, the invention is directed to a graphical user interface for informing a user of the progress of a copy/move operation and the functionality of allowing a user to modify the copy/move operation during operation execution.

2. Description of Related Art

The ability to copy and/or move files from one location in a computer system to another location is generally known in the art. When a copy operation, for example, is performed using known devices, a copy status graphical user interface is commonly displayed showing the name of the current file that is being copied and, optionally, a progress status bar. The progress status bar indicates graphically, the portion of the current file that has been copied and the portion that has not been copied. The progress status bar "fills up" from left to right as more of the file is copied from one location to another. When copying of a current file is complete, the same copy status graphical user interface is displayed for the next file in a series of files that is to be copied.

The copy status graphical user interface may further include a virtual button for canceling the copy operation. If a user selects the virtual cancel button, the entire copy operation is stopped. Consequently, the current file and any other files not already copied will not be copied.

Thus, with the known devices, the copy graphical user interface only informs a user of the current file being copied and does not allow a user to make modifications to the copy operation while the operation is being performed. As the present inventors have recognized, it would be advantageous to have an apparatus and method for providing a copy/move graphical user interface that informs the user of the current file status, the status of other files that are to be copied/moved in the copy/move operation, and that allows a user to make modifications to the copy/move operation while the copy/move operation is being performed.

SUMMARY OF THE INVENTION

The invention provides a copy/move graphical user interface apparatus and method. With the present invention, a copy/move instruction is received from a user via an input device. The received copy/move instruction indicates the files that are to be copied and the destination location of the copied files. In response to receiving the copy/move instruction, the identified files are placed in a copy/move queue. The total data size for the complete copy/move operation is then computed as the sum of the file sizes for all of the files that are to be copied/moved.

Either before, after, or at the same time as the calculation of the total data size, a status graphical user interface (GUI) is displayed. The GUI includes information pertaining to the progress of the copy/move process for a particular file, the progress of the entire copy/move operation, a listing of files and their associated attributes that are to be copied/moved in the present copy/move operation, estimated times of completion, and virtual buttons and boxes for modifying the copy/move operation or the view of the GUI.

Once the GUI is displayed, the copy/move operation is initiated with the first file in the copy/move queue. The copy/move process begins by first determining if the file has been designated by the user to be skipped. A user may enter, via an input device, a command for the copy/move operation to skip a particular file that is to be copied/moved. The command may be entered during the copy/move operation but before the file is copied/moved. If a skip command has been entered for the file, the copying/moving of the file is not performed and the copy/move operation proceeds to the next file in the copy/move queue.

If the skip command is entered after a file has been copied/moved, the skip command will be interpreted as a delete command requesting that the designated file be deleted from the copy/move destination location.

If a skip command has not been entered for the current file, the file data is then copied/moved from the current file to a destination location. During the copying/moving of data from the current file to the destination location, a copy/move rate of the copy/move operation is measured. A current file size is also determined and used, along with the copy/move rate and the total data size for the copy/move operation, to dynamically update estimated times of completion for one or both of the current file copy/move operation and the total copy/move operation.

In addition, the amount of data that has been copied is determined and used, along with the current file size and the total data size for the copy/move operation, to update progress bars associated with the current file copy/move operation and the total copy/move operation.

Additionally, the user may change the order in which the GUI displays the files in the copy/move queue or the order in which the files are actually copied/moved in the copy/move queue. Thus, with the present invention, a user is informed of the progress of a copy/move operation by providing information pertaining to files that have already been copied/moved in the copy/move operation, and also information pertaining to the particular file being copied/moved, the files that are pending in the copy/move queue, the estimated time of completion, and a progress bar graphically depicting the portion of the file and the portion of the entire copy/move operation completed. In addition, the user may modify the copy/move operation by instructing the processor to skip files, delete files, and change the order in which files are copied/moved.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary diagram of a data processing apparatus in which the present invention may be implemented;

FIG. 2 is an exemplary block diagram of a processing system in which the present invention may be implemented;

DETAILED DESCRIPTION OF THE PREFERRED EMBODIMENT

Figure 3:
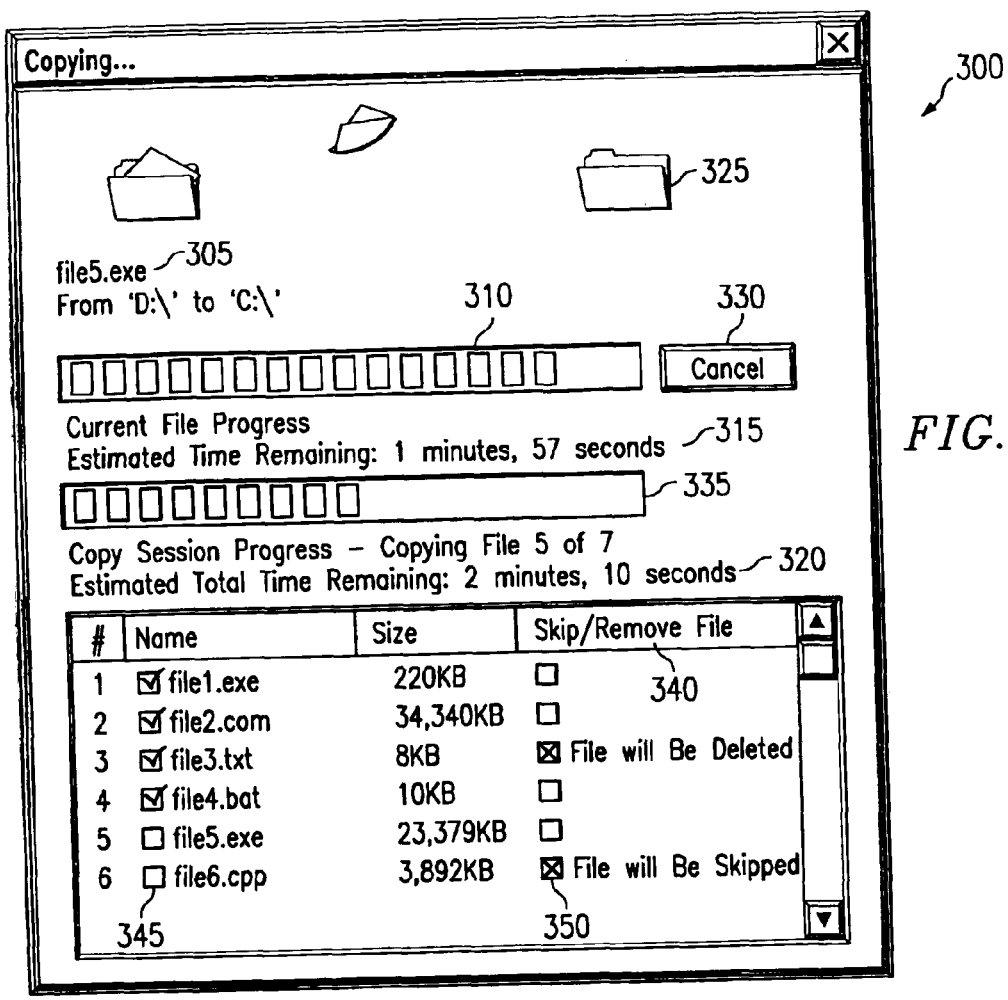
FIG. 3 is an exemplary diagram of a copy/move status graphical user interface according to the present invention.

FIG. 1 is an exemplary diagram of a data processing apparatus in which the present invention may be implemented. The particular data processing apparatus shown in FIG. 1 is a computer 100 however, other data processing apparatus, such as networked workstations, network server apparatus, and the like may be used as the data processing apparatus of the present invention. The computer 100 is used with the present invention to provide a copy/move graphical user interface, such as the graphical user interface depicted in FIG. 3.

The computer 100 may include a system unit 110, a video display terminal 102, a keyboard 104, storage devices 108, which may include floppy drives and other types of permanent and removable storage media, and pointing device 106, such as a computer mouse. Additional input devices may be included with the computer 100, such as a joystick, gamepad, touchpad, touchscreen, trackball, microphone, and the like. Computer 100 also preferably includes a graphical user interface that may be implemented by means of systems software residing in computer readable media in operation within computer 100.

With reference now to FIG. 2, a block diagram illustrates a data processing system 200 in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as OS/2 which is available from International Business Machines Corporation. "OS/2", is a trademark of International Business Machines Corporation. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processor 202 performs the functions described herein, based on instructions obtained from a user and computer program instructions stored, for example, in main memory 204, in memory 224, or instructions contained on one or more peripheral devices 226–230. In a preferred embodiment, the processor 202 performs the functions in a Microsoft Windows™ operating environment, although other windowed or non-windowed operating environments may be utilized without departing from the spirit and scope of the present invention.

The processor 202 receives a copy/move instruction from a user via the pointing device 106, keyboard 104, or the like, and keyboard and mouse adapter 220. A copy instruction is an instruction to create a copy of an existing file and place it in a designated location. Typically, the copy instruction may be input by selecting files to be copied and then selecting a destination location to which the files are to be copied.

Alternatively, the copy instruction may be received from an executing computer program, such as an installation program for installing a computer program. In such a case, the files to be copied are identified by the installation program.

Regardless of whether the copy instruction is received from a user or an executing computer program, the principles of this invention equally apply. The initial order in which files are copied to the destination location is set based on either the order in which the user selects the files to be copied or an order set by the executing computer program (e.g. an install program for installing a computer application, and the like). The following description of the invention will assume that the copy instruction is received from a user.

The selection of the files may be performed, for example, by highlighting a first file using a mouse 106, pressing a "shift" key on the keyboard 104 and highlighting additional files to be copied. The destination location may be selected by, for example, dragging the highlighted files to a particular directory on a hard disk or peripheral device. Such copying instructions are generally known to those of ordinary skill in the art.

Similarly, a move instruction is a copy instruction in which the original file is deleted. Thus, for purposes of the description of this invention, a copy instruction will be assumed. However, the details of this invention are equally applicable to a move instruction.

The actual functions of copying or moving files from one directory to another, or from one computer resource, network resource, or the like, to another are widely known in the art. Operating systems, such as DOS, Windows, and the like make use of copy and move functions on a routine basis. Therefore, the actual copy/move function will not be discussed herein in detail.

The copy instruction received by the processor 202 indicates the files that are to be copied and the destination location of the copied files. In response to receiving the copy instruction, the processor 202 places the identified files in a copy queue in main memory 204, for example. The processor 202 calculates the total data size for the complete copy operation. The total data size is the sum of the file sizes for the files that are to be copied. Thus, if three files having respective sizes, 100 KB, 20 KB and 30 KB, are to be copied, the total data size for the copy operation will be 600 KB.

The processor 202 also instructs the graphics adapter 218 to create a copy status graphical user interface, hereafter referred to as the GUI, which is then displayed by a display device, such as display 102, via the audio/video adapter 219. The GUI includes information pertaining to the progress of the copy process for a particular file, the progress of the entire copy operation, a listing of files and their attributes that have been copied, are being copied, and are pending to be copied in the present copy operation, estimated remaining times for completion, and virtual buttons and boxes for modifying the copy operation or the view of the GUI.

Once the GUI is displayed, the copy operation is initiated with the first file in the copy queue. The processor 202 begins the copy process by first determining if this file has been designated by the user to be skipped. A user may enter, via the keyboard 104, mouse 106, or other input device, a command for the copy operation to skip a particular file that is to be copied. The command may be entered prior to initiation of the copy operation or during the copy operation but before the file is copied. If a skip command has been entered for the file, the copying of the file is not performed and the copy operation proceeds to the next file in the copy queue.

If the skip command is entered after a file has been copied, the skip command will be interpreted by the processor 202 as a delete command requesting that the designated file that was previously copied be deleted from the destination location. The deletion of a file from the destination location will be described in more detail hereafter.

If a skip command has not been entered for the current file, the processor 202 begins to copy data from the current file to a destination location. The destination location may be on an internal or external device. For example, the copy operation may copy files from an internal hard drive to a storage medium in a floppy drive, CD-ROM drive, ZIP drive, magnetic tape drive or other external storage medium.

The processor 202, during the copying of data from the current file to the destination location, measures a copy rate of the copy operation. The copy rate may be, for example, in bits per second, bytes per second, or the like. The processor 202 also determines the current file size and uses this information along with the copy rate and the total data size for the copy operation, to update estimated times of completion for one or both of the current file copy operation and the total copy operation.

In addition, the processor 202 determines the amount of data that has been copied and uses this information along with the current file size and the total data size for the copy operation to update progress bars associated with the current file copy operation and the total copy operation. If a complete file has been copied, the displayed listing of files in the queue is modified to designate that the file has been copied.

Once the entire copy operation has been completed, those files that have been marked as delete will be deleted from the destination location. A confirmation message may be displayed to the user so that the user may select a virtual button authorizing the deletion of the marked files or abort the deletion of these files.

Furthermore, during the copy operation, a user may enter a cancel command in order to cancel the entire copy operation. If the cancel command is entered, all files still pending to be copied will not be copied, a current copy operation is aborted, and all the files are removed from the copy queue. The cancel command may be entered by the user via any type of input device, such as pressing an appropriate key or combination of keys on a keyboard, selecting a virtual "cancel" button via a pointing device, entering a verbal command via a voice recognition device, and the like.

Additionally, the user may change the order in which the GUI displays the files in the copy queue or the order in which the files are actually copied in the copy queue. For example, a user may instruct the GUI to display the files in alphabetical order, by increasing or decreasing size, by date of creation, and the like. The user may change the order in which the files will be copied by rearranging the displayed listing of files in the copy queue.

Thus, with the present invention, a user is informed of the progress of a copy/move operation by providing information pertaining to the particular file being copied, the files that have been copied, the files that are pending in the copy queue, the estimated time of completion, and a progress bar graphically depicting the portion of the file currently being copied and the portion of the entire copy operation completed. In addition, the user may modify the copy operation by instructing the processor to skip files, delete files, and change the order in which files are copied.

FIG. 3 is an exemplary diagram of a copy status GUI 300 according to the present invention. In this example, the GUI 300 is present in response to a copy instruction or command. This copy instruction may be administered by a command line interface or a GUI. With a GUI, a program such as Windows Explorer in Windows 98 may be used to select and copy multiple files.

As shown in FIG. 3, the GUI 300 includes a field 305 for identifying the filename of the current file being copied and the source and destination paths from and to which the file is being copied. The GUI 300 further includes a current file progress bar 310, an estimated time 315 remaining for the copying of the current file, an estimated time 320 for completion of the entire copy operation, a graphical icon illustrating the copy function, a virtual cancel button 330, a copy session (or operation) progress bar 335, and a copy queue display 340.

In this example, the graphical icon 325 may be stagnant or animated. The progress bars 310 and 335 "fill up" as the copy operation progresses. The virtual cancel button 330 may be selected in order to cancel the entire copy operation.

The copy session progress bar 335 may further include an indication of which file in the queue is currently being copied, such as "copying file 5 of 7." The estimated remaining times 315 and 320 are updated as the copy operation progresses, thereby decreasing as more data of the files is copied to the destination location. The estimated remaining times 315 and 320 may increase if, during a previous estimation, the copy rate was higher than the current copy rate.

The copy queue display 340 includes header buttons, such as "#", "Name", "Size", "Skip/Remove File", and the like, designating fields of the copy queue display for the various file attributes. The copy queue display 340 further includes a listing of files that are in the copy queue along with their respective attributes, in accordance with the header buttons. For example, each file in the copy queue is displayed with a copy order number, the filename of the file along with an indicator of whether the file has been copied or not, a file size, a skip/remove file indicator, and other file attributes, such as date of creation, and the like.

As files are copied to the designated destination location, the copy indicator is changed from a "not copied" indicator to a "copied" indicator. In the particular example shown in FIG. 3, the "not copied" indicator is an empty box while the "copied" indicator is a box with a check mark.

Similarly, the skip/remove file indicator for each file is either a "do not skip/remove" indicator or a "skip/remove" indicator. In the example shown in FIG. 3, the "do not skip/remove" indicator is an empty box while the "skip/remove" indicator is a box with an "X" and an associated text message that indicates whether the file will be skipped or deleted.

When a user selects the "do not skip/remove" indicator for a file that has not yet been copied, the "do not skip/remove" indicator will be changed to a "skip" indicator. Thus, the file will be skipped when the copy operation progresses to this file. If a user selects the "do not skip/remove" indicator for a file that has already been copied, the indicator will be changed to a "delete" indicator. As a result, the file will be deleted from the destination location when the total copy operation is completed. The skip or delete status of a file may be removed by again selecting the skip/remove indicator.

The header buttons of the copy queue display 340 may be selected in a first mode to change the view of the copy queue display 340 or in a second mode to change the order in which the files are copied. For example, if the "Name" header button is selected with a pointing device, such as a mouse, with a left mouse button, the listing of files in the copy queue display 340 may be changed so that the listing is in alphabetical order. If the "Name" header is again selected with the left mouse button, the listing may be changed to be in reverse alphabetical order. The same changes in view may be performed with file size (in order of increasing or decreasing size), date of creation (most recent to oldest or vice versa), and the like. Changing the view of the copy queue display 340 does not change the order in which files are copied to the destination location.

Furthermore, the header buttons may be selected in a second mode, such as by a right mouse button, to change the order in which the files are copied to the destination location. For example, if the "Size" header is selected using the right mouse button, the order in which the files are copied will be changed to an order of smallest file size to largest file size. If the "Size" header is again selected using the right mouse button, the order will be changed to largest file size to smallest file size. The reordering only affects those files that have not already been copied to the destination location. The view of the copy queue display 340 may be modified accordingly to reflect the change in the copy order.

In addition to changing the copy order using the header buttons, the copy order may be changed by selecting a file listing in the copy queue display 340 and then selecting a new position for the file listing in the copy queue display 340. For example, in the example shown in FIG. 3, the file "file6.cpp" may be selected using a mouse and dragged to a position before "file5.exe." Thus, the copy order of the non-copied files in the copy queue will be changed such that "file6.cpp" will be copied before "file5.exe." This ability to change the copy order may be advantageous if the user determines that he/she does not want to wait for "file5.exe," which is a very large file, to be copied before the relatively smaller file "file6.cpp" is copied.

Thus, the present invention provides the user with many options for modifying a copy operation while the copy operation is being executed. Furthermore, the present invention provides the user with detailed information about the copy operation so that the user may make informed decisions as to whether the copy operation satisfies the user's needs or whether the copy operation needs to be modified to suit the user's needs.

Figure 4:
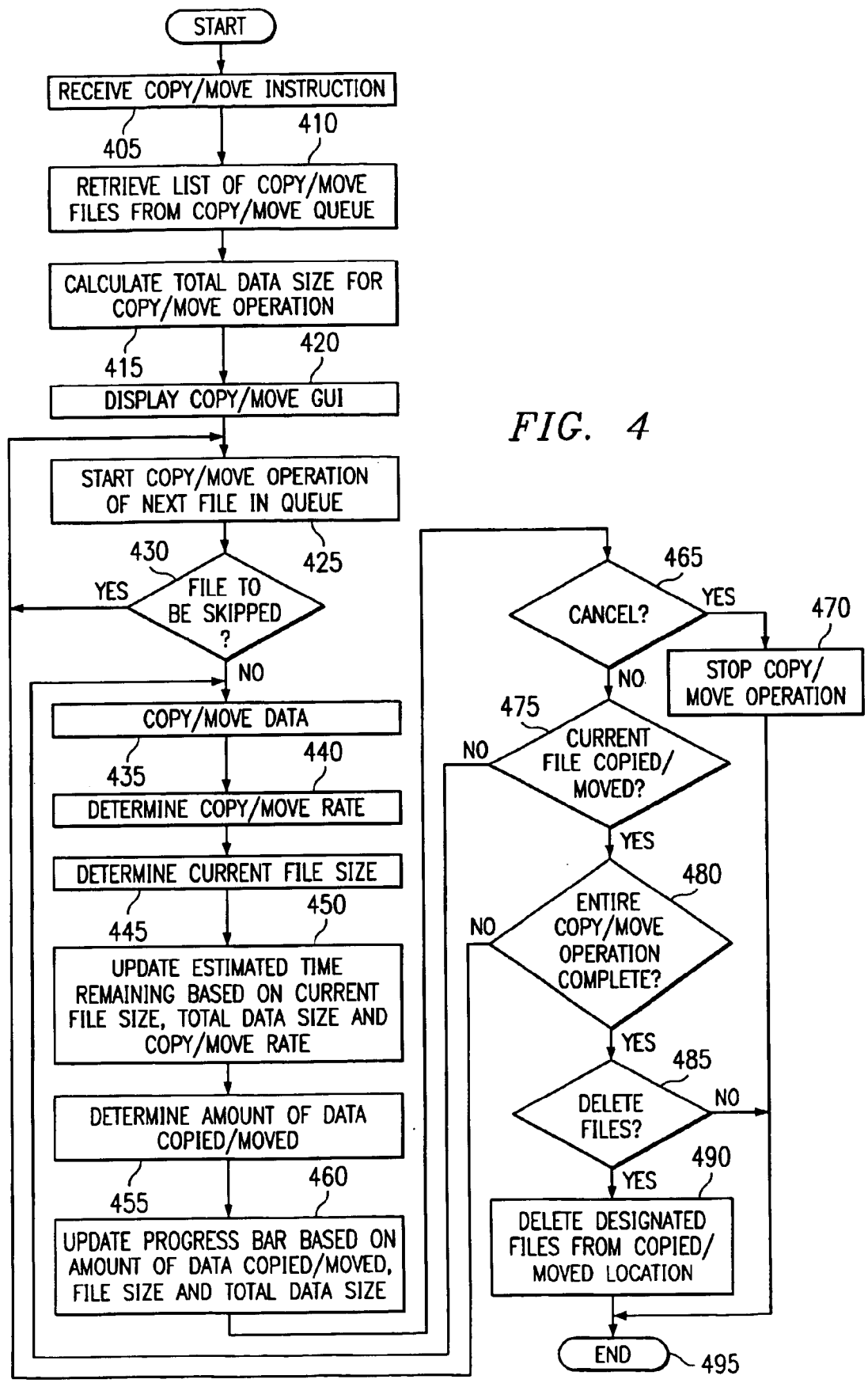
FIG. 4 is a flowchart outlining an exemplary operation for performing the copy/move operation according to the present invention.

FIG. 4 is a flowchart outlining an exemplary operation for performing a copy operation in accordance with the present invention. The operation starts with a copy/move instruction being received from a user (step 405). A list of the files that are to be copied/moved is then retrieved from the copy/move queue (step 410). A total data size for the copy/move operation is calculated (step 415) and the copy/move GUI is displayed (step 420).

The copy/move operation for the next file in the copy/move queue is started (step 425) and it is determined whether or not the file is to be skipped (step 430). If the file is to be skipped (step 430:YES), the operation skips the file and starts the copy/move operation for the next file in the copy/move queue (step 425). If the file is not to be skipped (step 430:NO), the file data is copied to the selected destination location (step 435). The rate at which the data is copied/moved is determined (step 440) and the estimated times remaining in the copying of the current file and the entire copy operation are updated (step 450). The GUI may then be updated to reflect the updated estimated remaining times.

The amount of data that has been copied/moved is then determined (step 455) and the progress bars for the current file and the copy operation are updated accordingly (step 460). It is then determined whether the copy operation has been canceled by the user inputting a cancel command (step 465). If there has been a cancel command entered (step 465:YES), the copy/move operation is stopped (step 470) and the operation ends (step 495). If the cancel command has not been entered (step 465:NO), it is determined whether or not the entire es current file has been copied/moved (step 475). If the current file has not been completely copied/moved (step 475:NO), the operation continues to copy/move data to the destination location (step 435). If the current file has been completely copied/moved (step 475:YES), a determination is made as to whether the entire copy/move operation has been completed (step 480).

If the entire copy/move operation has not been completed (step 480:NO), the copying/moving operation proceeds to the next file in the copy/move queue (step 425). If the entire copy/move operation has been completed (step 480:YES), it is determined whether any of the files copied were designated "delete" by the user during the copy operation (step 485). If so (step 485:YES), the files designated "delete" are deleted from the destination location (step 490). This may occur after first asking the user to confirm the deletion of the files. If no files are designated "delete" (step 485:NO), the copy/move operation ends (step 495).

Figure 5:
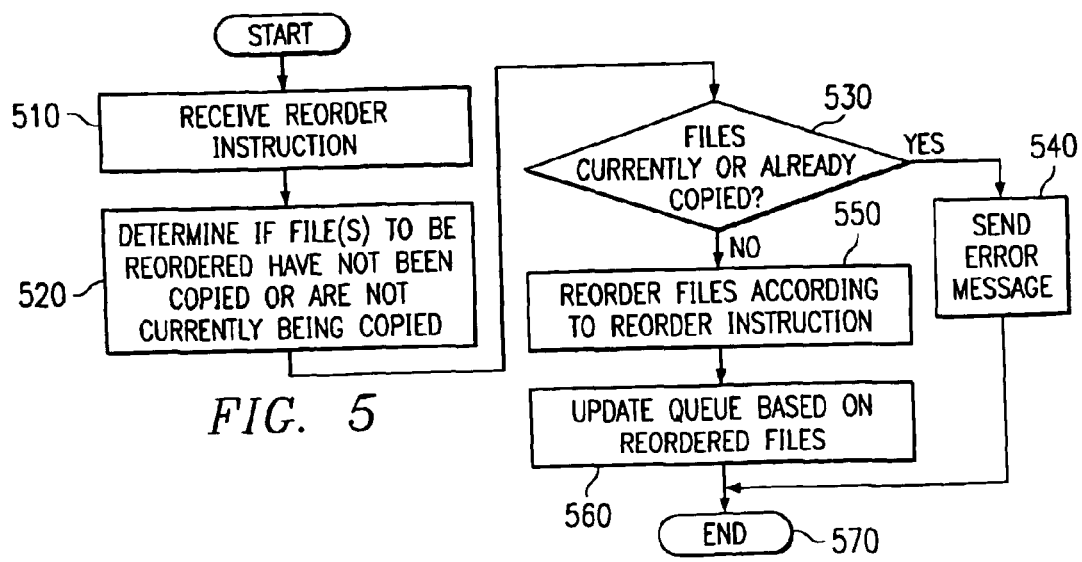
FIG. 5 is a flowchart outlining an exemplary operation for modifying a copy/move operation according to the present invention.

FIG. 5 is a flowchart outlining an exemplary operation for modifying the copy order in a copy queue according to the invention. The operation shown in FIG. 5 is equally applicable to a move operation.

As shown in FIG. 5, the operation starts with receiving a reorder instruction from a user (step 510). As described above, this reorder instruction may be from a second mode selection of a header button or from moving queue items within the copy/move queue. A determination is then made as to whether the files to be reordered have not been copied or are not currently being copied (step 520). If the files have already been copied or are currently being copied (step 530:YES), an error message is sent to the user (step 540) and the reorder operation is ended (step 570).

If the files have not already been copied or are hot currently being copied (step 530:NO), the files are reordered according to the particular reorder instruction received (step 550), i.e. by file size, file name, particular position in the copy queue, and the like. The displayed copy queue is then updated based on the reordering of the files (step 560) and the operations ends (step 570).

Thus, with the present invention, a user is provided with all the necessary information to monitor and modify a copy/move operation while the copy/move operation is being performed. In this way, the user is provided with greater control over the copy/move operation than was previously possible with the known prior art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although FIG. 3 depicts a particular format, the GUI of the present invention may vary in presentation. For example, estimated times 315 and 320 may be present using dials rather than text and progress bars 310 and 335 may be vertical bars that fill up as the copy operation progresses or may be circles that fill up radially as the copy operation progresses. Other additional information, such as verification operations involved in copying files, also may be included on the GUI 300. A location of the destination file on the storage device also may be illustrated. Many other modifications to the GUI 300 may be made without departing from the spirit and scope of the present invention.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of copying computer files to a destination location, comprising:

receiving a copy instruction, the copy instruction identifying a plurality of computer files to be copied, an order in which the plurality of computer files are to be copied and the destination location;

displaying attributes of the plurality of computer files simultaneously, in the order in which the plurality of computer files are to be copied; and copying the plurality of computer files to the destination location in the order in which the plurality of computer files are to be copied.

2. The method of claim 1, wherein the plurality of computer files includes a currently copying computer file, the currently copying computer file being a computer file that is being copied at the same time the attributes of the plurality of computer files are displayed.

3. The method of claim 2, further comprising displaying a progress indicator indicating an amount of the currently copying computer file that has been copied to the destination location.

4. The method of claim 2, further comprising displaying an estimated time of completion of copying the currently copying computer file.

5. The method of claim 3, wherein displaying the progress indicator includes:

identifying a data size of the currently copying computer file;

identifying an amount of data, corresponding to the currently copying computer file, that has already been copied to the destination location; and displaying the progress indicator based on the data size of the currently copying computer file and the amount of data that has already been copied.

6. The method of claim 4, wherein displaying the estimated time of completion includes:

identifying a copy rate;

identifying a data size of the currently copying computer file;

identifying an amount of data, corresponding to the currently copying computer file, that has already been copied to the destination location; and displaying the estimated time of completion based on the copy rate, the data size of the currently copying computer file and the amount of data that has already been copied to the destination location.

7. The method of claim 1, further comprising displaying a progress indicator indicating an amount of data of the plurality of computer files that has been copied to the destination location.

8. The method of claim 7, wherein displaying the progress indicator includes:

identifying a data size of the plurality of computer files;

identifying an amount of data, corresponding to the plurality of computer files, that has already been copied to the destination location; and displaying the progress indicator based on the data size of the plurality of computer files and the amount of data that has already been copied.

9. The method of claim 1, further comprising displaying an estimated time of completion of copying the plurality of computer files to the destination location.

10. The method of claim 9, wherein displaying the estimated time of completion includes:

identifying a copy rate;

identifying a data size of the plurality of computer files;

identifying an amount of data, corresponding to the plurality of computer files, that has already been copied to the destination location; and displaying the estimated time of completion based on the copy rate, the data size of the plurality of computer files, and the amount of data that has already been copied.

11. The method of claim 1, further comprising rearranging, during copying of the plurality of computer files, the order in which the plurality of computer files are to be copied.

12. The method of claim 11, wherein rearranging the order in which the plurality of computer files are to be copied includes selecting a computer file from the plurality of computer files, using the display of the plurality of computer files, and changing its position in the order in which the plurality of computer files are to be copied.

13. The method of claim 11, wherein rearranging the order in which the plurality of computer files to be copied includes reordering the plurality of computer files based on ore or more of the attributes of the plurality of computer files in accordance with a reorder criteria.

14. The method of claim 13, wherein the attributes of the plurality of computer files include at least one of a filename, a file data size and a creation date.

15. The method of claim 13, wherein the re order criteria includes at least one of alphabetical order, reverse alphabetical order, smallest to largest file data size, largest to smallest file data size, oldest to most recent file creation date, and most recent to oldest file creation date.

16. The method of claim 1, wherein displaying the attributes of the plurality of computer files includes displaying the attributes of the plurality of computer files in a graphical user interface.

17. The method of claim 1, further comprising:

receiving a skip command; and changing a display of an attribute of a computer file from the plurality of computer files to indicate that the computer file is to be skipped during copying of the plurality of computer files.

18. The method of claim 17, further comprising not copying computer files that have been indicated as being computer files that are to be skipped during copying of the plurality of computer files.

19. The method of claim 1, further comprising:

receiving a delete command; and changing a display of an attribute of a computer file from the plurality of computer files to indicate that the computer file is to be deleted after copying of the plurality of computer files.

20. The method of claim 19, further comprising deleting computer files that have been indicated as being computer files to be deleted, after copying of the plurality of computer files, from the destination location.

21. A data processing device in which computer files are copied to a destination location, comprising:

a processor;

an input device; and a display, wherein the processor receives a copy instruction via the input device, the copy instruction identifying a plurality of computer files to be copied, an order in which the plurality of computer files arm to be copied and the destination location, the processor instructs the display to display attributes of the plurality of computer files simultaneously, in the order in which the plurality of computer files are to be copied, and wherein the processor copies the plurality of computer files to the destination location in the order in which the plurality of computer files are to be copied.

22. The data processing device of claim 21, wherein the plurality of computer files includes a currently copying computer file, the currently copying computer file being a computer file that is being copied at the same time the attributes of the plurality of computer files are displayed on the display.

23. The data processing device of claim 22, wherein the processor further instructs the display to display a progress indicator indicating an amount of the currently copying computer file that has been copied to the destination location.

24. The data processing device of claim 23, wherein the processor identifies a data size of the currently copying computer file and an amount of data, corresponding to the currently copying computer file, that has already been copied to the destination location, and instructs the display to display the progress indicator based on the data size of the currently copying computer file and the amount of data that has already been copied.

25. The data processing device of claim 22, wherein the processor further the display to display an estimated time of completion of copying the currently copying computer file.

26. The data processing device of claim 25, wherein the processor identifies a copy rate, a data size of the currently copying computer file, and an amount of data, corresponding to the currently copying computer file, that has already been copied to the destination location, and wherein the processor instructs the display displaying the estimated time of completion based on the copy rate, the data size of the currently copying computer file and the amount of data that has already been copied to the destination location.

27. The data processing device of claim 21, wherein the processor further instructs the display to display a progress indicator indicating an amount of data of the plurality of computer files that has been copied to the destination location.

28. The data processing device of claim 27, wherein the processor identifies a data size for the plurality of computer files and an amount of data, corresponding to the plurality of computer files, that has already been copied to the destination location, and wherein the processor instructs the display to display the progress indicator based on the data size of the plurality of computer files and the amount of data that has already been copied.

29. The data processing device of claim 21, wherein the processor further instructs the display to display an estimated time of completion of copying the plurality of computer files to the destination location.

30. The data processing device of claim 29, wherein the processor identifies a copy rate, a data size of the plurality of computer files and an amount of data, corresponding to the plurality of computer files, that has already been copied to the destination location, and wherein the processor instructs the display to display the estimated time of completion based on the copy rate, the data size of the plurality of computer files, and the amount of data that has already been copied.

31. The data processing device of claim 21, wherein the processor rearranges, during copying of the plurality of computer files, the order in which the plurality of computer files are to be copied.

32. The data processing device of claim 31, wherein the processor instructs the order in which the plurality of computer files are to be copied by receiving a selection of a computer file from the plurality of computer files and changing its position in the order in which the plurality of computer files are to be copied.

33. The data processing device of claim 31, wherein the processor rearranges the order in which the plurality of computer files are to be copied by reordering the plurality of computer files based on one or more of the attributes of the plurality of computer files in accordance with a reorder criteria.

34. The data processing device of claim 33, wherein the attributes of the plurality of computer files include at least one of a filename, a file data size and a creation date.

35. The data processing device of claim 33, wherein the reorder criteria includes at least one of alphabetical order, reverse alphabetical order, smallest to largest file data size, largest to smallest file data size, oldest to most recent file creation date, and most recent to oldest file creation date.

36. The data processing device of claim 21, wherein the processor instructs the display to display the attributes of the plurality of computer files in a graphical user interface.

37. The data processing device of claim 21, wherein a skip command is received via the input device and the processor instructs the display to change the display of an attribute of a computer file from the plurality of computer files to indicate that the computer file is to be skipped during copying of the plurality of computer files.

38. The data processing device of claim 37, wherein the processor does not copy computer files that have been indicated as being computer files that are to be skipped during copying of the plurality of computer files.

39. The data processing device of claim 21, wherein a delete command is received via the input device and the processor instructs the display to change the display of an attribute of a computer file from the plurality of computer files to indicate that the computer file is to be deleted after copying of the plurality of computer files.

40. The data processing device of claim 39, wherein the processor deletes computer files that have been indicated as being computer files to be deleted, after copying of the plurality of computer files, from the destination location.

41. A computer programs product in a computer readable medium for copying computer files, comprising:
   first instructions for receiving a copy instruction, the copy instruction identifying a plurality of computer files to be copied, an order in which the plurality of computer files are to be copied and the destination location;
   second instructions for displaying attributes of the plurality of computer files simultaneously, in the order in which the plurality of computer files are to be copied; and
   third instructions for copying the plurality of computer files to the destination location in the order in which the plurality of computer files are to be copied.

42. The computer program product of claim 41, wherein the plurality of computer files includes a currently copying computer file, the currently copying computer file being a computer file that is being copied at the same time the attributes of the plurality of computer files are displayed.

43. The computer program product of claim 42, wherein the second instructions further include instructions for displaying a progress indicator indicating an amount of the currently copying computer file that has been copied to the destination location.

44. The computer program product of claim 43, wherein the second instructions further include instructions for identifying a data size of the currently copying computer file, identifying an amount of data, corresponding to the currently copying computer file, that has already been copied to the destination location, and displaying the progress indicator based on the data size of the currently copying computer file and the amount of data that has already been copied.

45. The computer program product of claim 42, wherein the second instructions further include instructions for displaying an estimated time of completion of copying the currently copying computer file.

46. The computer program product of claim 45, wherein the second instructions further include instructions for identifying a copy rate, identifying a data size of the currently copying computer file, identifying an amount of data, corresponding to the currently copying computer file, that has already been copied to the destination location, and displaying the estimated time of completion based on the copy rate, the data size of the currently copying computer file and the amount of data that has already been copied to the destination location.

47. The computer program product of claim 41, wherein the second instructions further include instructions for displaying a progress indicator indicating an amount of data of the plurality of computer files that has been copied to the destination location.

48. The computer program product of claim 47, wherein the second instructions further include instructions for identifying a data size of the plurality of computer files, identifying an amount of data, corresponding to the plurality of computer files, that has already been copied to the destination location, and displaying the progress indicator based on the data size of the plurality of computer files and the amount of data that has already been copied.

49. The computer program product of claim 41, wherein the second instructions further include instructions for displaying an estimated time of completion of copying the plurality of computer files to the destination location.

50. The computer program product of claim 49, wherein the second instructions include instructions for identifying a copy rate, identifying a data size of the plurality of computer files, identifying an amount of data, corresponding to the plurality of computer files, that has already been copied to the destination location, and displaying the estimated time of completion based on the copy rate, the data size of the plurality of computer files, and the amount of data that has already been copied.

51. The computer program product of claim 41, further comprising fourth instructions for rearranging, during copying of the plurality of computer files, the order in which the plurality of computer files are to be copied.

52. The computer program product of claim 41, her comprising fourth instructions for rearranging, during copying of the plurality of computer files, the order in instructions include instructions a computer file from the plurality of computer files, using the display of the plurality of computer films and changing its position in the order in which the plurality of computer files are to be copied.

53. The computer program product of claim 51, wherein the fourth instructions include instructions for reordering the plurality of computer files bases on one or more of the attributes of the plurality of computer files in accordance with a reorder criteria.

54. The computer program product of claim 53, wherein the attributes of the plurality of computer files include at least one of a filename, a file data size and a creation date.

55. The computer program product of claim 53, wherein the reorder criteria includes at least one of alphabetical order, reverse alphabetical order, smallest to largest file data size, largest to smallest file data size, oldest to most recent file creation date, and most recent to oldest file creation date.

56. The computer program product of claim 41, wherein the second instructions further include instructions for displaying the attributes of the plurality of computer files in a graphical user interface.

57. The computer program product of claim 41, further comprising:

fourth instructions for receiving a skip command; and fifth instructions for changing a display of an attribute of a computer file from the plurality of computer files to indicate that the computer file is to be skipped during copying of the plurality of computer files.

58. The computer program product of claim 57, further comprising sixth instructions for not copying computer files that have been indicated as being computer files that ar to be skipped during copying of the plurality of computer files.

59. The computer program product of claim 41, further comprising:

fourth instructions for receiving a delete command; and fifth instructions for changing a display of an attribute of a computer file from the plurality of computer files to indicate that the computer file is to be deleted after copying of the plurality of computer files.

60. The computer program product of claim 59, further comprising sixth instructions for deleting computer files that have been indicated as being computer files to be deleted, after copying of the plurality of computer files, from the destination location.

61. A method, in a data processing system, for copying a plurality of files, the method comprising:

in response to receiving a request to copy the plurality of files to a destination location, displaying an identification of the plurality of files in a graphical user interface simultaneously in an order in which the plurality of files are to be copied to the destination, wherein the request includes the order in which the plurality of files are to be copied;

copying the plurality of files to the destination in the order; and altering the identification of the plurality of files to indicate a progress in copying individual files within the plurality of files to the destination.

62. The method of claim 61, wherein the request is a first request and further comprising:

responsive to receiving a second request to remove a file from the plurality of files, copying the file is canceled the file and altering the graphical user interface to indicate cancellation of the copying of the file.

63. The method of claim 61, wherein the copying of the plurality of files removes the plurality of files from a source of the plurality of files.

* * * * *

UNITED STATES PATENT AND TRADEMARK OFFICE
CERTIFICATE OF CORRECTION

PATENT NO. : 6,874,130 B1  
APPLICATION NO. : 09/506228  
DATED : March 29, 2005  
INVENTOR(S) : Baweja et al.

It is certified that error appears in the above-identified patent and that said Letters Patent is hereby corrected as shown below:

Col. 9, line 20: after "or are" delete "hot" and insert --not--.

Col. 11, line 21: after "files" insert --are--.
Col. 11, line 22: after "based on" delete "ore" and insert --one--.
Col. 11, line 28: after "wherein the" delete "re order" and insert --reorder--.
Col. 11, line 64: after "files" delete "arm" and insert --are--.
Col. 12, line 27: after "further" insert --instructs--.
Col. 12, line 44: after "size" delete "for" and insert --of--.
Col. 13, line 2: after "processor" delete "instructs" and insert --rearranges--.
Col. 14, lines 51-54: after "claim"
    delete: "41, her comprising fourth instructions for rearranging, during copying of the plurality of computer files, the order in instructions include instructions"
    and insert --51, wherein the fourth instructions include instructions for selecting--.
Col. 14, line 56: after "computer" delete "films" and insert --files--.
Col. 14, line 60: after "files" delete "bases" and insert --based--.
Col. 15, line 17: after "files that" delete "ar" and insert --are--.
Col. 16, line 21: before "and altering" delete "the file".

Signed and Sealed this

Eighth Day of August, 2006

JON W. DUDAS  
*Director of the United States Patent and Trademark Office*